United States Patent
Hahn et al.

[19]

[11] Patent Number: 6,061,345
[45] Date of Patent: May 9, 2000

[54] CROSSBAR ROUTING SWITCH FOR A HIERARCHICAL CROSSBAR INTERCONNECTION NETWORK

[75] Inventors: Jong Seok Hahn; Kyoung Park; Woo Jong Hahn; Kee Wook Rim, all of Daejon-Shi, Rep. of Korea

[73] Assignee: Electronics and Telecommunications Research Institute, Taejon-Shi, Rep. of Korea

[21] Appl. No.: 08/941,130

[22] Filed: Sep. 30, 1997

[30] Foreign Application Priority Data

Oct. 1, 1996 [KR] Rep. of Korea ..................... 96-43443

[51] Int. Cl.[7] ........................... H04L 12/28; H04L 12/56; H04Q 19/00
[52] U.S. Cl. ...................... 370/351; 370/389; 340/825.79
[58] Field of Search ................................. 390/357, 360, 390/380, 389, 398, 356, 439, 422, 351; 340/825.79, 825.85, 825.89, 825.86, 825.9, 825.91; 370/357, 360, 380, 389, 398, 356, 439, 422, 351, 386, 391, 392, 396

[56] References Cited

U.S. PATENT DOCUMENTS

| | | | |
|---|---|---|---|
| 4,630,045 | 12/1986 | Georgiou | 340/825.79 |
| 4,890,282 | 12/1989 | Lambert et al. | |
| 5,123,011 | 6/1992 | Hein et al. | 370/58.1 |
| 5,191,578 | 3/1993 | Lee | 370/63 |
| 5,345,228 | 9/1994 | Franaszek et al. | 340/825.79 |
| 5,745,486 | 4/1998 | Beshai et al. | 370/352 |

OTHER PUBLICATIONS

Peter Newman, ATM Technology for Corporate Networks, IEEE Communication Magazine. Apr. 1992, 90–100, Apr. 1994.

*Primary Examiner*—Ajit Patel
*Assistant Examiner*—Duc Ho
*Attorney, Agent, or Firm*—Cohen, Pontani, Lieberman & Pavane

[57] ABSTRACT

A routing switch for constructing an interconnection network of a parallel processing computer is disclosed. A purpose of the present invention is to provide a crossbar routing switch for a hierarchical interconnection network which has an expandability of a data length and an expandability of a hierarchical structure. The crossbar routing switch for a hierarchical interconnection network in accordance with the present invention comprises a predetermined number of input control units for controlling one input port to perform the manipulation of input data; a crossbar core unit for analyzing a data transmission request by the input control unit and outputting the corresponding data; and a predetermined number of output control unit for controlling one output port and receiving the output data from the crossbar core unit to output it to the output port. The present invention has advantages over the prior art that a data expandability can be provided by simply adding a routing switch without re-designing or re-manufacturing the routing switch several times, and that it can be suitably adapted to an interconnection network of a parallel processing system which requires a high expandability and high performance.

6 Claims, 3 Drawing Sheets

CROSSBAR ROUTING SWITCH FOR A HIERARCHICAL CROSSBAR INTERCONNECTION NETWORK

BACKGROUND OF THE INVENTION

1. Field of the Invention

The present invention relates to a routing switch for constructing an interconnection network of a parallel processing computer, and more particularly, to a crossbar routing switch for constructing a hierarchical crossbar interconnection network which can be easily expanded in a parallel processing computer performing a high speed parallel processing based on clusters.

2. Description of the Related Art

A parallel processing computer consists of a plurality of processing nodes, and an interconnection network which interconnects the plurality of processing nodes to provide data paths therebetween. The interconnection network, which is an essential part of the parallel processing computer, is an important factor in determining the architecture and performance of the parallel processing computer. The interconnection network should provide an efficient way of interconnection and an expansibility for interconnecting a lot of processing nodes.

A routing switch gives a great deal of influence upon the performance of the overall system because the characteristic of the interconnection network is determined by the characteristic of a routing switch which is one of the elements of the interconnection network. Parallel processing systems have peculiar structural characteristics tailored to their specific applications. The most critical element defining the structural characteristic is a connection architecture, i.e., an interconnection network which interconnects processors within the system.

Most parallel processing systems are constructed in a hierarchical structure and generally consists of 2 or 3 hierarchical layers. The lowest layer consists of a uniprocessor node or Symmetric Multi-Processing (SMP) node. The SMP node has one connection architecture, and is considered as a sub-system which can be independently operated depending on the type of the system. These uniprocessor nodes or SMP nodes are interconnected to form one hierarchical layer which is generally independently operated and is referred to as a "cluster".

A module which defines the structural characteristic of the parallel processing system constructed in a hierarchical structure is a routing switch which forms a interconnection network of a hierarchical structure. Most routing switches have been proposed as having basic features of a crossbar switch. These switches have been used in a communication system as well as in a computer system.

The crossbar switch disclosed by Frank E. Barber, et al. in the article entitled "A 64×17 Non-Blocking Crosspoint Switch," IEEE Int'l Solid-State Circuits Conference, pp 116–117, Feb. 18, 1988 is a non-blocking switch commonly used for applications to communications which has 64 inputs and 17 outputs. The crossbar switch disclosed by Hyun J. Shin, et al. in the article entitled "A 250-Mbit/s CMOS Crosspoint Switch," IEEE Journal of Solid-State Circuits Conference, pp 478–486, April 1989 is a high speed switch having 16 inputs and 16 outputs. These switches are a single bit serial transmission switch of a circuit switch type, and these switches use a centralized routing scheme wherein a routing control signal is provided from an external module to determine a data path. These switches are not suitable for most computer systems which use a distributed routing scheme with a packet switch, and are generally used in a communication system of a circuit switch type and the centralized routing scheme.

The interconnection networks and routing switches proposed for use in a parallel processing system or multiprocessing system perform a parallel transmission in a unit of byte.

The switching element disclosed in U.S. Pat. No. 4,890,281 (Dec. 26, 1989) to Gian P. Balboni, et al. entitled "Switching Element for Self-Routing Multistage Packet-Switching Interconnection Network" is a routing switch which forms a multistage packet switching interconnection network having a self-routing control capability. This switching element is a packet switch for a multistage interconnection network such as Omega, Delta, Benes interconnection networks which has 2 inputs and 2 outputs. This switching element is characterized in that it resolves a routing conflict generated in an interconnection network by using time information. The switching element devised by Gian P. Balboni, et al. has a drawback that it is not suitable for an interconnection network of a hierarchical structure because it uses a store and forward (SAF) routing control scheme and is used solely for a multistage interconnection network due to the structural constraints.

The switching element disclosed in Korean Patent No. 9,307,017 (Jul. 26, 1993) to S. Kim and K. Lee entitled "Switching Device of Interconnection Network for Preventing Deadlock Using Mesh Network" is a routing switch for preventing a deadlock in a mesh interconnection network which inherently causes a deadlock. The switching element disclosed in European patent application No. 93,113,397.9 filed on Mar. 23, 1993 by Howard T. Olnowich and Arthur R. Williams and entitled "Multiple Torus Switching Apparatus" is a switching element which can enhance the performance of an interconnection network by selecting an optimum path having a small delay time from multipaths between a transmitting node and a receiving node in a Torus-Mesh interconnection network using a conventional Wormhole routing control scheme. The switching elements disclosed by S. Kim, et al. and Howard T. Olnowich are switching elements for use in a mesh interconnection network and a Torus-Mesh interconnection network, respectively, and thus are not suitable for a interconnection network of a hierarchical structure.

Although the Mesh interconnection network and Torus-Mesh interconnection network have excellent expansibility, they are not adequate for a parallel processing system having a hierarchical structure consisting of clusters.

The shunt interconnection network proposed by Steven E. Butner, et al. in the article entitled "A Fault-Tolerant GaAs/CMOS Interconnection Network for Scalable Multiprocessors," IEEE Journal of Solid-State Circuits, pp 692–705, May 1991 is a crossbar interconnection network having a hierarchical structure. This interconnection network is a hierarchical structure of extensibility and a combination of a plurality of switching elements, a plurality of network interface elements, and a controller for controlling the switching elements and network interface elements, and is disadvantageous in that a basic block should be designed several times to extend the data length. In other words, in this interconnection network, the extension of a data length is supported, however for the realization thereof, it is inevitable to re-design a basic block.

SUMMARY OF THE INVENTION

It is therefore an object of the present invention to provide a crossbar routing switch for a hierarchical interconnection network which has an expansibility of a data length due to the expansibility of a hierarchical structure and the adoption of a byte slice concept.

In accordance with one aspect of the present invention, a crossbar routing switch for a hierarchical interconnection network is provided which comprises a predetermined number of input control units each controlling one input port to perform the manipulation of input data; crossbar core unit for analyzing a data transmission request by said input control units and for outputting the corresponding data; and a predetermined number of output control units each controlling one output port and receiving the output data from said crossbar core unit to output it to the output port.

One crossbar routing switch provides ten independent input ports and ten independent output ports. Two input ports and two output ports of the ten input and output ports are connected to an upper level crossbar routing switch, and the remaining eight input ports and eight output ports are connected to a node or a lower level crossbar routing switch. Therefore, an expansibility of a hierarchical structure can be provided.

The "n" crossbar routing switches, which independently performs a distributed routing control, are constructed in a byte slice manner. Each crossbar interconnection network provides data expansibility by simply adding a routing switch without designing or manufacturing the routing switch several times. Thus, the crossbar interconnection network in accordance with the present invention can be suitably adapted to an interconnection network of a parallel processing system which requires a high expansibility and high performance.

The internal structure of the crossbar routing switch in accordance with the present invention generally includes one crossbar core unit, ten input control units, and ten output control units. The crossbar core unit analyzes the data transmission request by the ten input ports of the crossbar routing switch, and performs an internal arbitration and routing control such that the corresponding data is transmitted to the ten output ports in accordance with the arbitration result. The crossbar core unit comprises ten arbitration requesters, eight general routing controllers, one adaptive routing controller, ten data pass controllers, and one supervisory controller.

One input control unit controls the respective one of the ten input ports, and takes charge of the sampling and synchronization of each input data, the control of a packet buffer, and the flow control of packets. The input control unit generally includes one data synchronizer, one data buffer, one buffer input controller, and one buffer output controller.

One output control unit controls the respective one of the ten output ports, synchronizes the flow control signal input from an external unit, and reads the status of the flow control signal to transmit it to the crossbar core unit. Each of the output control units comprises one output ready synchronizer.

BRIEF DESCRIPTION OF THE DRAWINGS

For a fuller understanding of the nature and object of the invention, reference should be had to the following detailed description taken in conjunction with the accompanying drawings in which.

The present invention will become more apparent upon a detailed description of the preferred embodiments for carrying out the invention as rendered below. In the description to follow, references will be made to the accompanying drawings, where like reference numerals are used to identify like or similar elements in the various drawings and in which.

Similar reference characters refer to similar parts in the several views of the drawings.

DETAILED DESCRIPTION OF THE INVENTION

Figure 1:
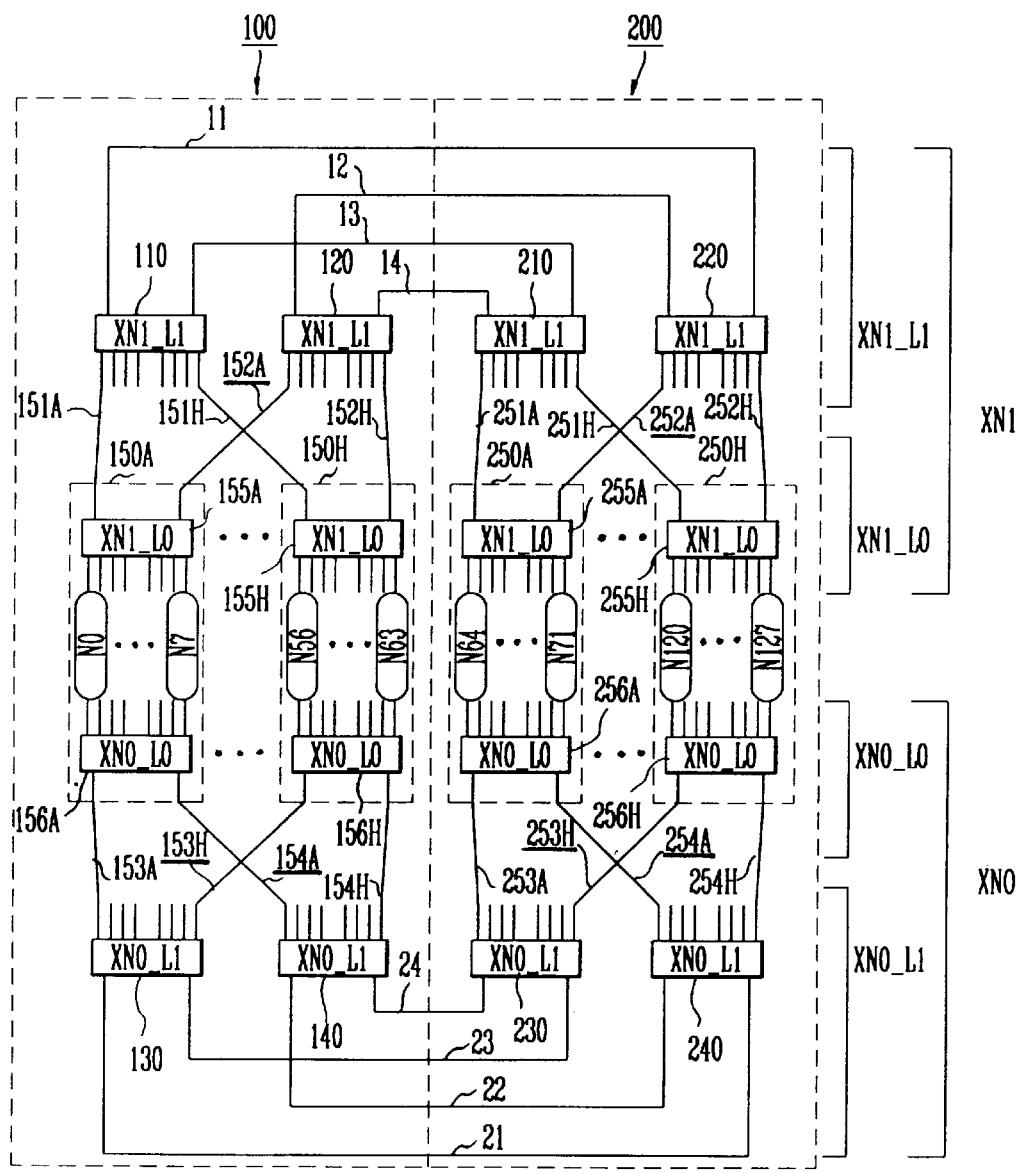
FIG. 1 illustrates a schematic view of a hierarchical crossbar interconnection network wherein 128 nodes are interconnected.

FIG. 1 illustrates a schematic view of a hierarchical crossbar interconnection network wherein 128 nodes are interconnected. Referring to FIG. 1, a layer-2 cluster 100 comprises 8 layer-1 clusters 150A–150H, 4 crossbar interconnection networks 110, 120, 130, 140, and a plurality of interconnection links 151A–151H, 152A–152H, 153A–153H, 154A–154H. One layer-2 cluster 100 can interconnect up to 64 nodes. Two links are provided between nodes in the same layer-1 cluster, and four interconnection links are provided between nodes in one layer-1 cluster and nodes in the other layer-1 cluster.

In order to construct the layer-2 cluster, four separate layer-2 cluster interconnection networks 110, 120, 130, 140 should be used since each of the layer-1 clusters 150A–150H has 4 interconnection links to upper level clusters. The layer-2 cluster interconnection network 110 has 8 interconnection links 151A–151H to lower level clusters and 2 interconnection links 11, 13 to upper level clusters for constructing a layer-3 cluster. Similarly, the other three layer-2 cluster interconnection networks 120, 130, 140 have 8 interconnection links 152A–152H, 153A–153H, 154A–154H to lower level clusters, respectively. Each of the three layer-2 cluster interconnection networks 120, 130, 140 has 2 interconnection links 12, 14, 21, 23, 22, 24 to upper level clusters for constructing a layer-3 cluster.

In the layer-2 crossbar interconnection network 110, each of 8 interconnection links 151A–151H to lower level clusters is connected to an interconnection link to upper level clusters of 8 layer-1 clusters 150A–150H. Similarly, the interconnection links 152A–152H, 153A–153H, 154A–154H to lower level clusters of the other three layer-2 crossbar interconnection networks 120, 130, 140 are connected to an interconnection link to upper level clusters of 8 layer-1 clusters 150A–150H. The other layer-2 cluster 200 is constructed in a symmetrical fashion with respect to the afore-mentioned layer-2 cluster 100.

The schematic view shown in FIG. 1 illustrates a structure wherein a maximum of 128 nodes can be interconnected by interconnecting 2 layer-2 clusters 100, 200. Eight interconnection links 11–14, 21–24 are formed between 2 layer-2 clusters 100, 200. In other words, if 2 layer-2 clusters 100, 200 are directly connected, a total of 8 interconnection links 11–14, 21–24 is formed since each layer-2 cluster 100, 200 has 8 interconnection links to layer-3 clusters.

Figure 2:
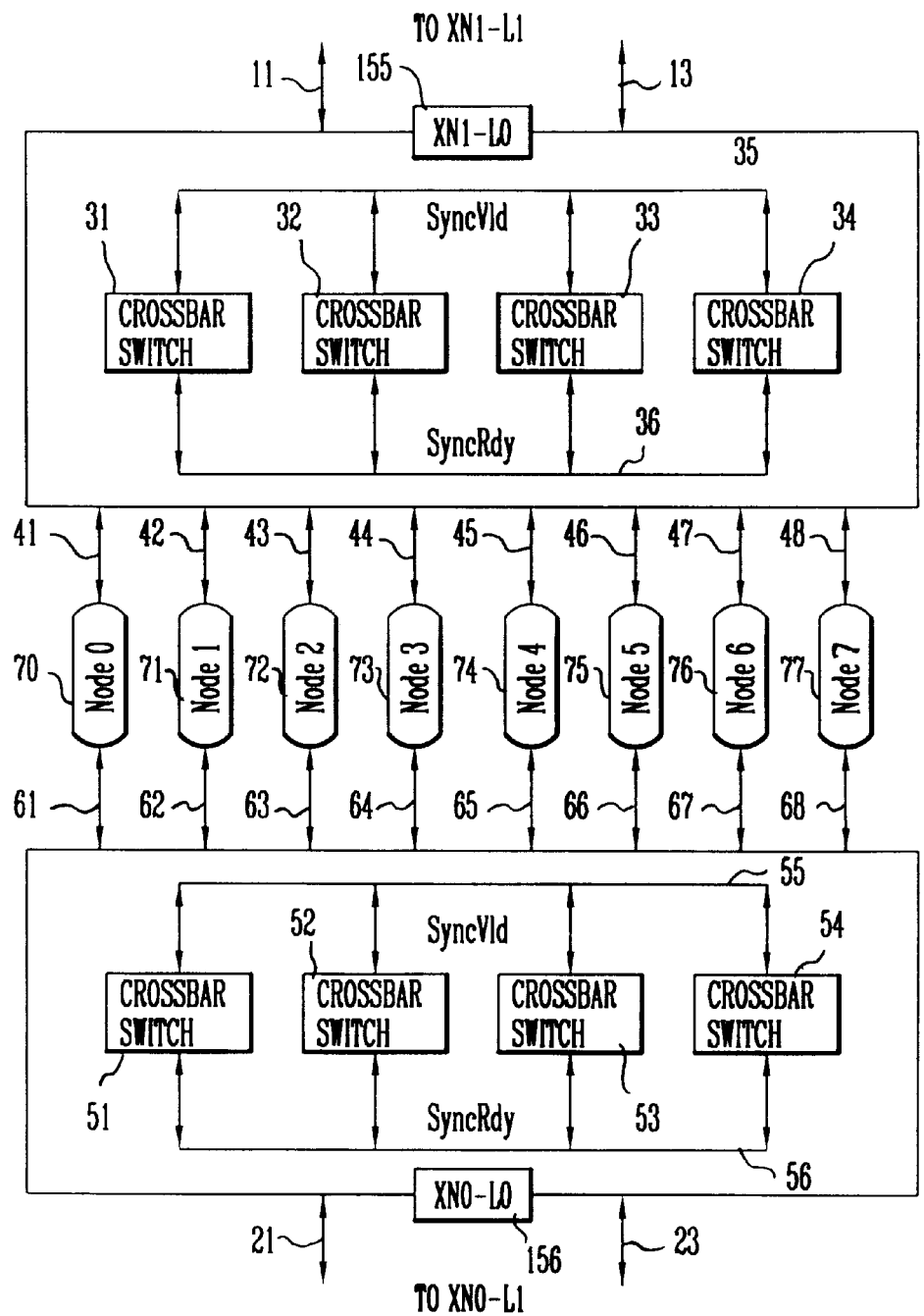
FIG. 2 illustrates a schematic view of a hierarchical crossbar interconnection network which constructs a layer-1 cluster.

FIG. 2 illustrates a schematic view of a hierarchical crossbar interconnection network which constructs a layer-1 cluster. A hierarchical crossbar interconnection network forming a layer-1 cluster will now be explained with reference to FIG. 2 to illustrate that a routing switch in accordance with the present invention supports an extension of a data length by using a byte slice concept.

A crossbar interconnection network (XN1-LO) 155 comprises n byte sliced crossbar routing switches 31–34, 8 links 41–48 for interconnecting 8 nodes 70–77, and 2 links 11, 13 for connecting to a layer-2 cluster. The n crossbar routing switches 31–34, 51–54 which construct each crossbar interconnection network 155, 156 by using a byte slice concept perform a distributed routing control, and provide 10 input ports of one byte data length and 10 output ports of one byte data length. Thus, if a single crossbar interconnection network is formed by 4 crossbar routing switches, 32 bit data length can be provided, and if a single crossbar interconnection network is formed by 8 crossbar routing switches, 64 bit data length can be provided.

The crossbar routing switch in accordance with the present invention does not use a separate controller in extending a data length, and performs its function by interconnecting synchronization signals SyncVld, SyncRdy directly provided by the switch without the process of re-designing or re-building. Routing switches 31–34, 51–54 of each crossbar interconnection network 155, 156 formed by 2 crossbar interconnection networks are interconnected by 2 synchronization signals 35, 36, 55, 56. The synchronization signals SyncVld 35, 55 are a signal for synchronizing an input flow of the data transmitted to the input port. In this case, one routing switch among a plurality of crossbar routing switches is operated as a master to control the input flow of the other slave routing switch.

The synchronization signals SyncRdy 36, 56 are a signal for synchronizing the flow of the output ready signal transmitted to the output port. One routing switch designated as a master of the synchronization signals SyncVld 35, 55 controls the flow of the output ready signal of the other slave routing switch.

Each crossbar routing switch provides an adaptive routing function independently. Thus, if n crossbar routing switches are byte sliced with the result that one link among 2 interconnection links 11, 13 to upper level clusters is being used in one crossbar interconnection network 155, an adaptive routing control is performed from the crossbar interconnection network to other links in the crossbar interconnection network to allow data to be transmitted to the same destination. The two interconnection links 21, 23 to upper level clusters in the other crossbar interconnection network 156 also perform the adaptive routing control as mentioned above.

Figure 3:
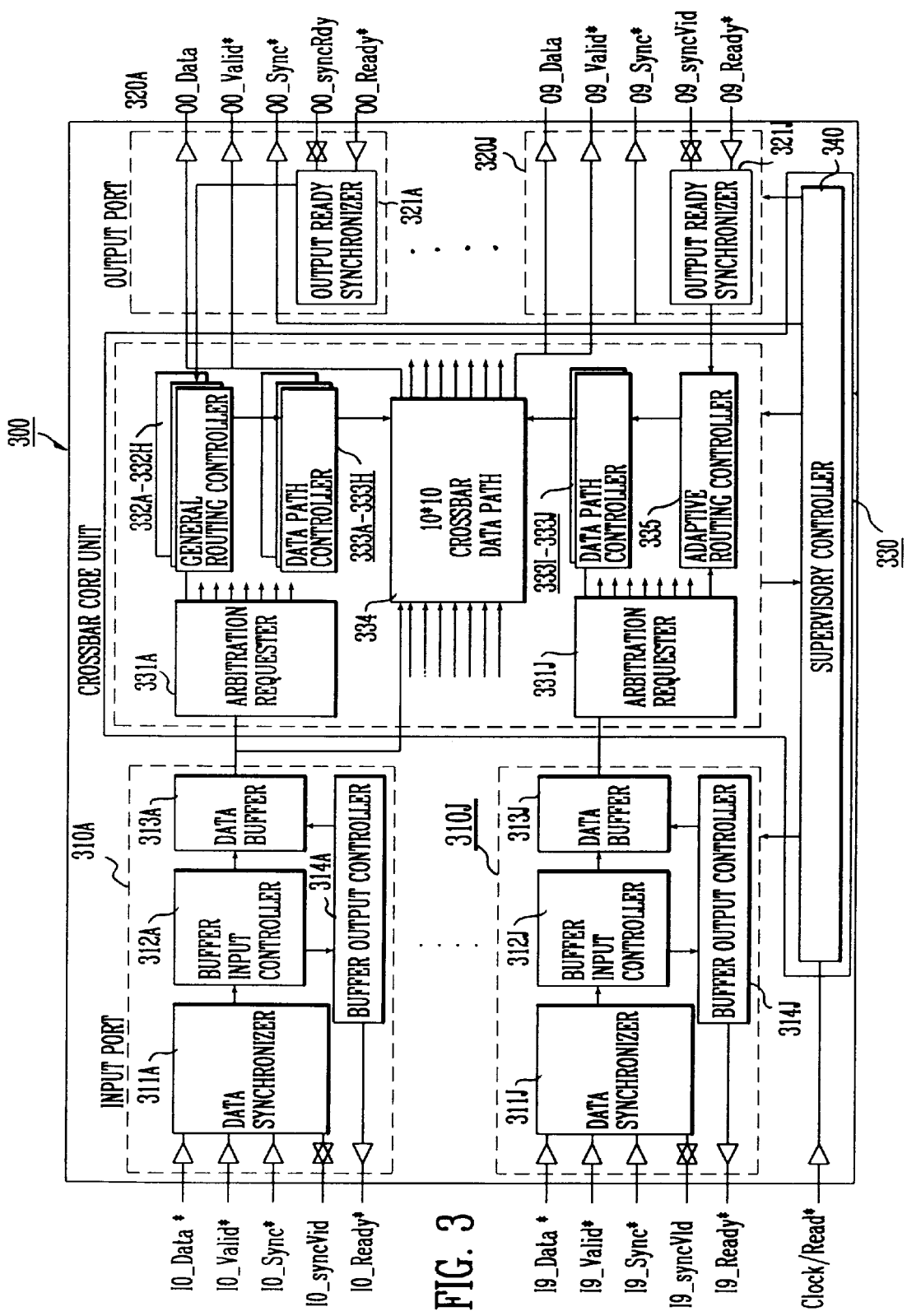
FIG. 3 illustrates a schematic view of a crossbar routing switch in accordance with the present invention.

FIG. 3 illustrates a schematic view of a crossbar routing switch in accordance with the present invention. The structure of the crossbar routing switch in accordance with the present invention will now be described with reference to FIG. 3.

The internal structure of the crossbar routing switch 300 generally includes one crossbar core unit 330, ten input control units 310A–310J, and ten output control units 320A–320J. The crossbar core unit 330 performs the internal arbitration and routing control such that a request for data transmission from ten input ports of the crossbar routing switch 300 is analyzed, and the corresponding data is transmitted to ten output ports in accordance with the arbitration result. The crossbar core unit 330 comprises ten arbitration requesters 331A–331J, eight general routing controllers 332A–332H, one adaptive routing controller 335, data path controllers 333A–333H and 333I–333J, and one supervisory controller 340. The arbitration requesters 331A–331J detect data driven at the outputs of data packet buffers 313A–313J of the input control units 310A–310J, respectively to perceive a tag portion and data portion. If the perceived portion is the tag, an arbitration is requested to the relevant routing controllers 332A–332H, 355.

The general routing controllers 332A–332H and adaptive routing controller 335 perceive the respective arbitration request signals, perform arbitrations, and inform the data path controllers 333A–333H and 333I–333J corresponding to each routing controller of the results. In this case, the general routing controllers 332A–332H control the respective data path controllers 333A–333H. The adaptive routing controller 335 controls two data path controllers 333I–333J. The data path controllers 333A–333J provide a physical transmission path according to the arbitration results informed from the general routing controllers 332A–332H or the supervisory controller 340. The supervisory controller 340 generates a control clock necessary to control resources, performs an overall flow control and broadcast control, and executes the corresponding functions described in a control vector of a network control packet.

One of the input control units 310A–310J controls the respective one of the ten input ports, and takes charge of the sampling and synchronization of each input data, the control of a packet buffer, and the flow control of packets. The input control units 310A–310J comprise one data synchronizer 311A–311J, one data buffer 313A–313J, one buffer input controller 312A–312J, and one buffer output controller 314A–314J.

The data synchronizers 311A–311J store data by using a synchronization signal, which is input from an external source, and control the synchronization of the external synchronization signal and the internal clock to transmit data to the buffer input controllers 312A–312J. If an arbitrary crossbar routing switch is designated as a synchronization master, the synchronization signal of said arbitrary crossbar routing switch SyncVld is driven to another crossbar routing switch to allow byte-sliced routing switches to simultaneously store data into the data buffers 313A–313J. The data buffers 313A–313J temporarily store transmitted packets when a collision occurs on a packet transmission path.

The buffer input controllers 312A–312J control the flow of inputs to the data buffers 313A–313J, and transmit the output data of the data synchronizers 311A–311J to the data buffers 313A–313J. The buffer output controllers 314A–314J control the flow of the outputs, and informs a crossbar core unit 330 of the status of the data buffers 313A–313J (not shown).

The output control units 320A–320J control the respective output ports, synchronize the flow control signal input from an external unit, and read the status of the flow control signal to transmit it to the supervisory controller 340. Each of the output control units 320A–320J comprises one output ready synchronizer 321A–321J. The output ready synchronizers 321A–321J synchronize the flow control signal input from an external unit to transmit it to the supervisory controller 340 (not shown).

If one of the data synchronizers 311A–311J is designated as a synchronization master, the flow control signal SyncRdy of said one of the data synchronizers 311A–311J is driven to another crossbar routing switch to allow byte sliced routing switches to simultaneously use the flow control signal.

As described above, the present invention is advantageous over the prior art in that excellent data expansibility can be provided by simply adding a routing switch without re-designing or re-manufacturing the routing switch several times, and that it can be suitably adapted to an interconnection network of a parallel processing system which requires a high expansibility and high performance.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

The foregoing description, although described in its preferred embodiment with a certain degree of particularity, is only illustrative of the principles of the present invention. It is to be understood that the present invention is not to be limited to the preferred embodiments disclosed and illustrated herein. Accordingly, all expedient variations that may be made within the scope and spirit of the present invention are to be encompassed as further embodiments of the present invention.

What is claimed is:

1. A crossbar routing switch for a hierarchical interconnection network comprising:
   a predetermined number of input control units for controlling one input port to perform not only the sampling and synchronization of input data, the control of a packet buffer, and the flow control of packets but also the synchronization of operations among neighbor switches to allow byte sliced switches to simultaneously store data into a data buffer, said each input control unit comprising a data synchronizer, a data buffer, a buffer input controller, and a buffer output controller;
   a crossbar core unit for analyzing data transmission requests submitted by the input ports of the crossbar routing switch, and performing an internal arbitration and routing control such that the corresponding data is transmitted to the output ports in accordance with an arbitration result, said crossbar core unit comprising a predetermined number of arbitration requesters, a predetermined number of general routing controllers, one adaptive routing controller, a predetermined number of data path controllers, and one supervisor controller; and
   a predetermined number of output control units, for controlling one output port to perform not only the synchronization of input flow control signal but also the synchronization of operations among neighbor switches to allow byte sliced switches to simultaneously use the input flow control signal, said each output control unit comprising an output ready synchronizer.

2. The crossbar routing switch in accordance with claim 1, wherein said input control unit comprises:
   a data synchronizer for synchronizing an external synchronization signal with an internal clock, and performing the synchronization of operations among neighbor switches to allow byte sliced switches to simultaneously store data into a data buffer;
   a buffer input controller for transmitting the input data output from said data synchronizer;
   a data buffer for receiving the controlled output data from said buffer input controller, temporarily storing transmitted packets when a collision occurs on a packet transmission path, and bypassing transmitted packets when a collision does not occur; and
   a buffer output controller for transmitting data stored in said data buffer to said crossbar core unit and signaling a status of a data buffer to another crossbar routing switch.

3. The crossbar routing switch in accordance with claim 2, wherein when said data synchronizer is designated a synchronization master, a synchronization signal generated by said data synchronizer drives another crossbar routing switch so as to allow byte sliced routing switches to simultaneously store data into said data buffer.

4. The crossbar routing switch in accordance with claim 1, wherein said crossbar core unit comprises:
   a predetermined number of arbitration requesters each receiving as input the data from said corresponding input control unit and generating an arbitration request;
   an adaptive routing controller for receiving as input the arbitration request from one of said arbitration requesters and generating an arbitration result;
   a predetermined number of general routing controllers each receiving as input the arbitration requests from the another of said arbitration requesters and generating arbitration results;
   a predetermined number of data pass controllers, each receiving as input the arbitration results from one of said adaptive routing controller and said general routing controllers and generating a control signal;
   a crossbar data path comprising a data path comprising a physical transmission path, said crossbar data path receiving as input the control signal output from said data path controllers and controlling said crossbar data path and the corresponding data path; and
   a supervisory controller for generating a control clock signal for controlling resources and performing overall flow control, broadcast control, and corresponding functions in a control vector of network control packets.

5. The crossbar routing switch in accordance with claim 4, wherein said output control unit comprises an output ready synchronizer for synchronizing externally input flow control signals and reading statuses of the flow control signals for transmission to said supervisory controller.

6. The crossbar routing switch in accordance with claim 5, wherein when said output ready synchronizer is a synchronization master, a synchronization flow control signal of said output ready synchronizer drives another crossbar routing switch allowing byte sliced routing switches to simultaneously use the flow control signal.

* * * * *